April 27, 1954  W. W. EATON ET AL  2,676,514
FLOW FILM PHOTOGRAPHIC APPARATUS
Filed Oct. 4, 1949  9 Sheets-Sheet 1

Inventors
William W. Eaton
Harold T. Olson
By
Attorney

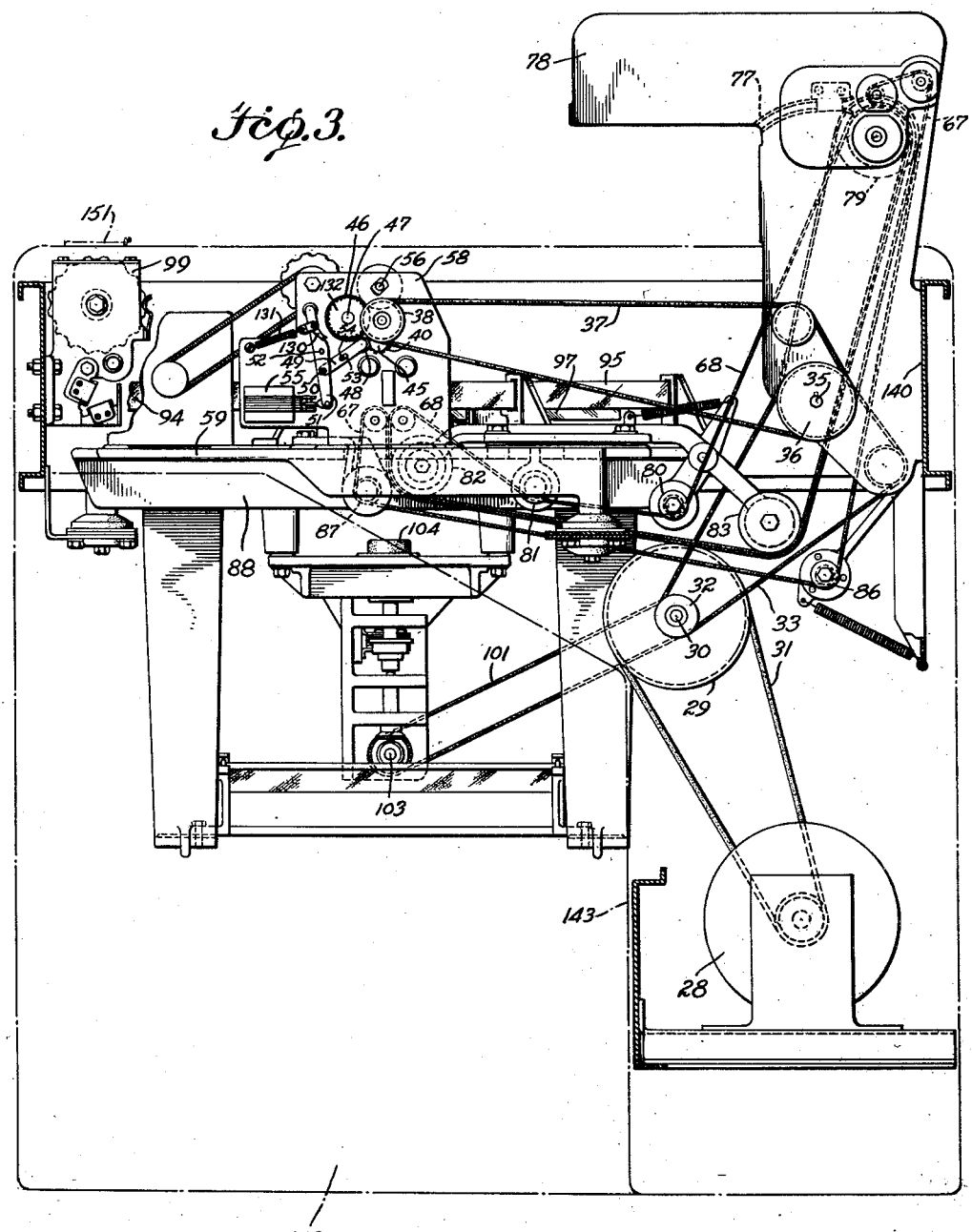

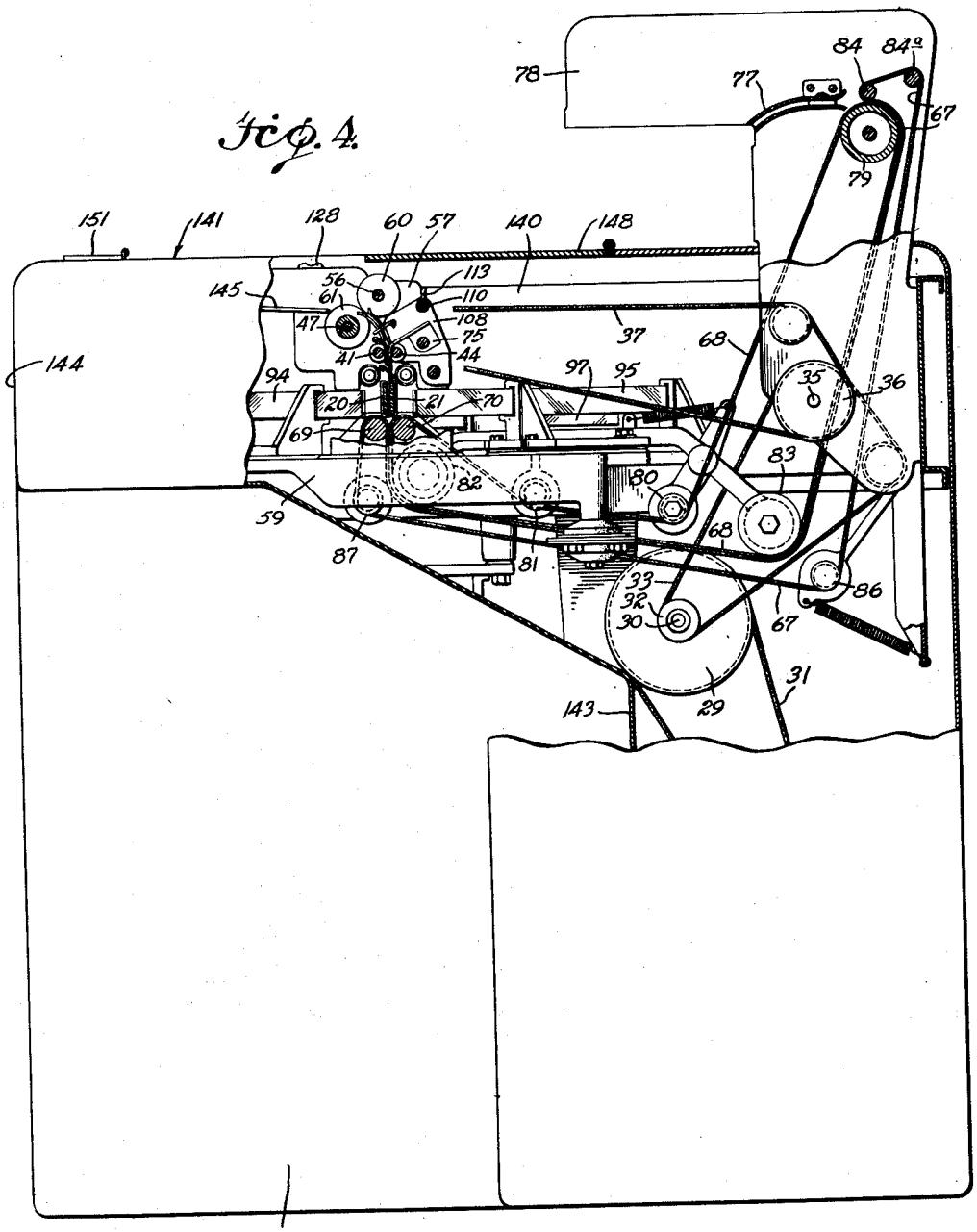

April 27, 1954 W. W. EATON ET AL 2,676,514
FLOW FILM PHOTOGRAPHIC APPARATUS
Filed Oct. 4, 1949 9 Sheets-Sheet 4
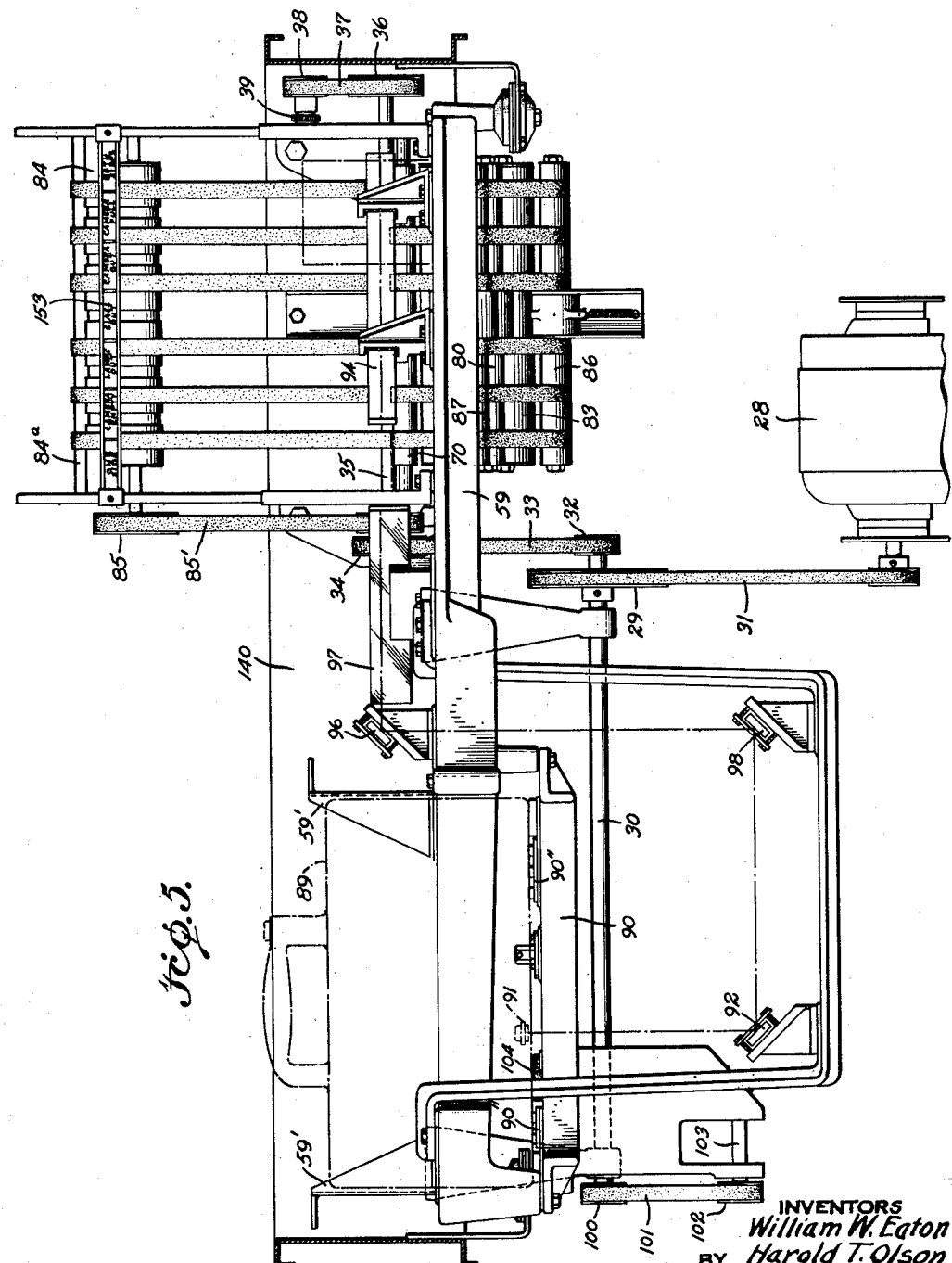
INVENTORS
William W. Eaton
Harold T. Olson
BY
ATTORNEY

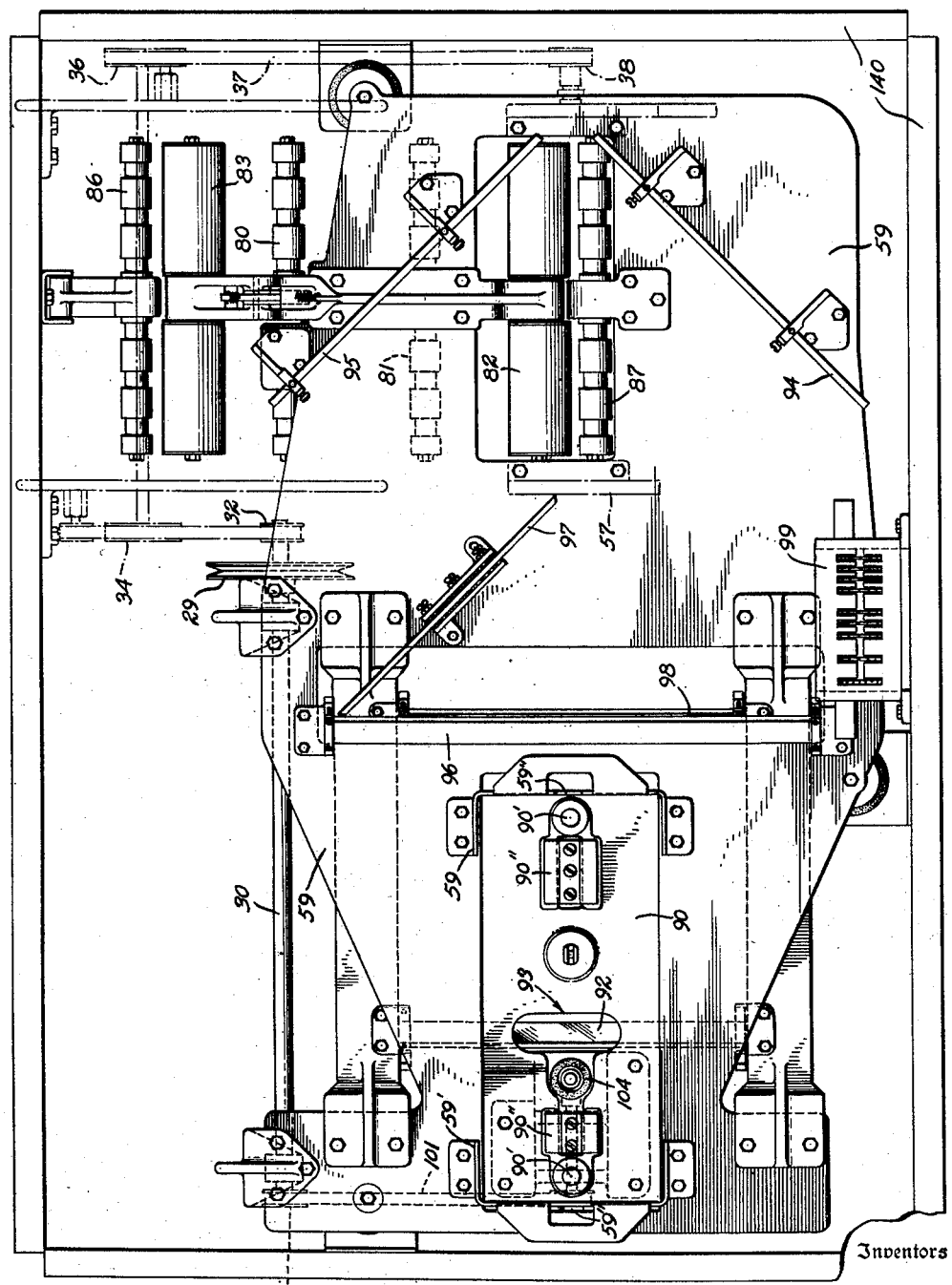

April 27, 1954 W. W. EATON ET AL 2,676,514
FLOW FILM PHOTOGRAPHIC APPARATUS
Filed Oct. 4, 1949 9 Sheets-Sheet 6
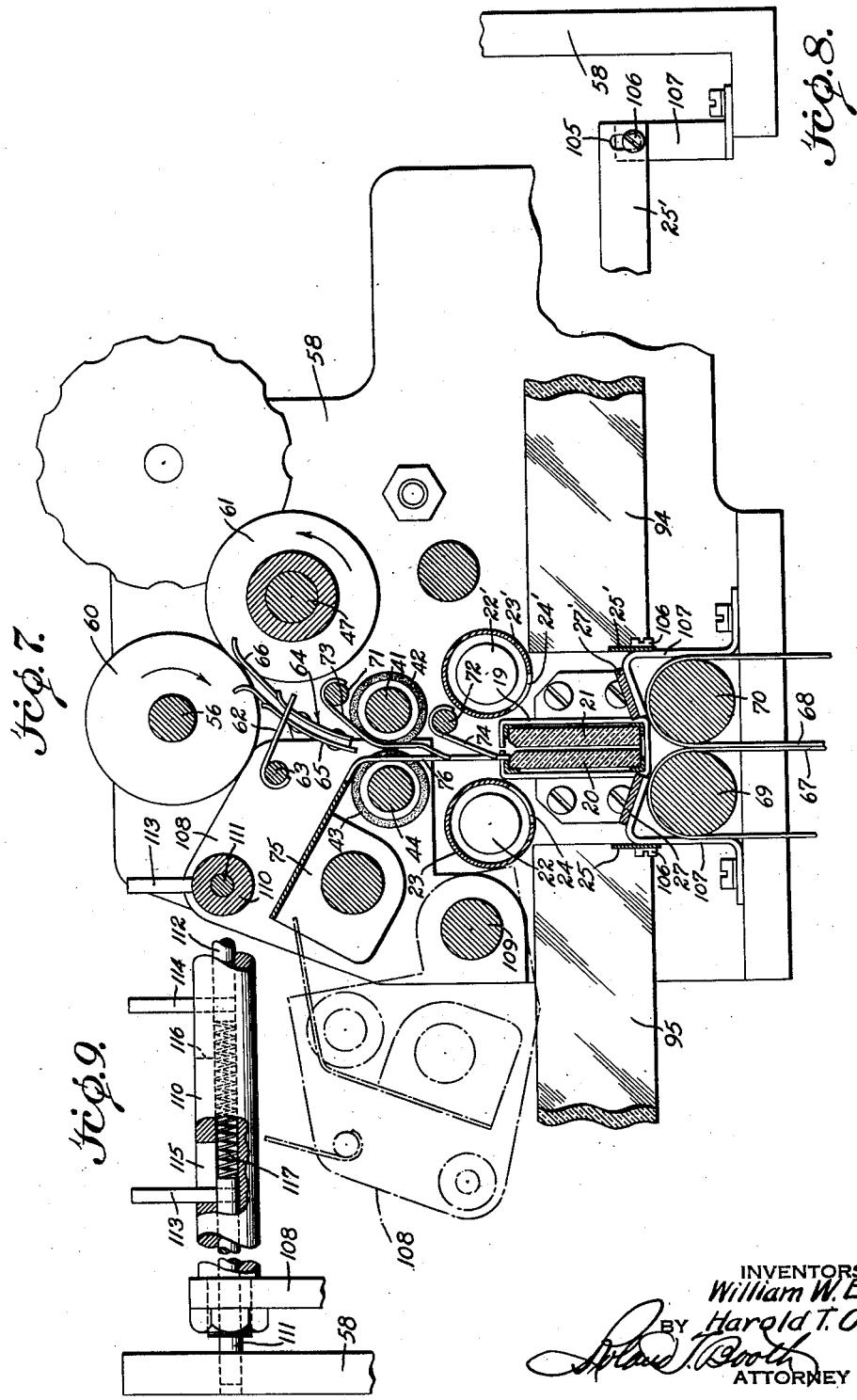
INVENTORS
William W. Eaton
Harold T. Olson
BY
ATTORNEY

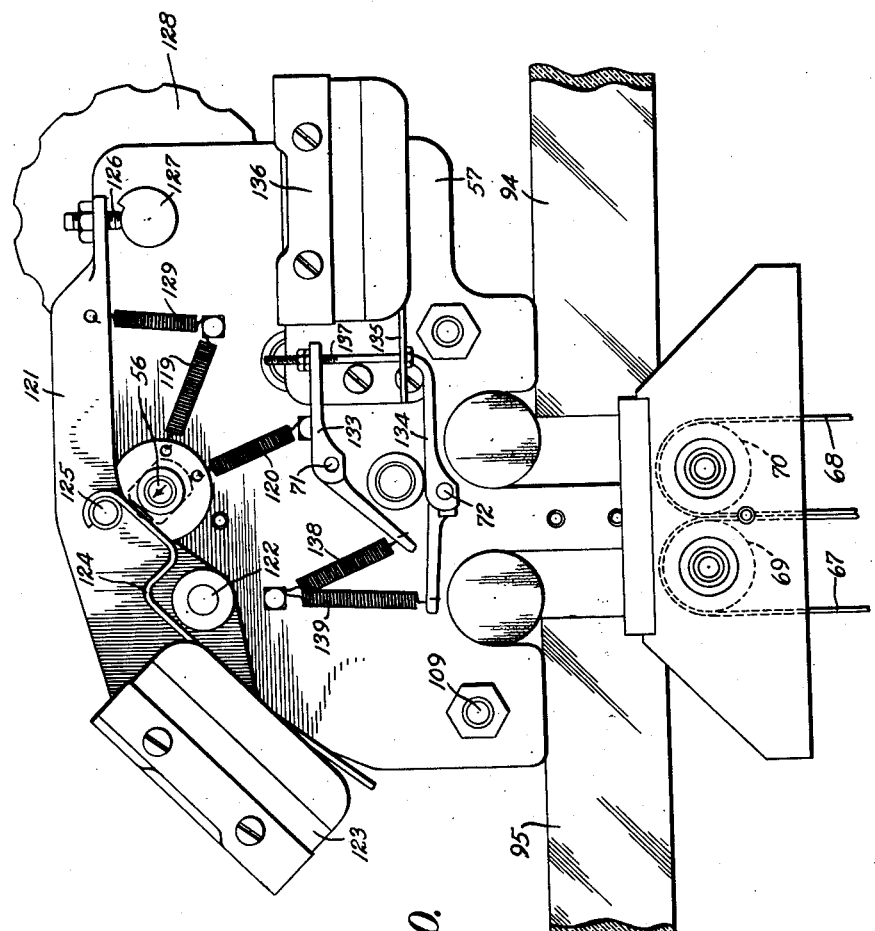

April 27, 1954  W. W. EATON ET AL  2,676,514
FLOW FILM PHOTOGRAPHIC APPARATUS
Filed Oct. 4, 1949  9 Sheets-Sheet 8

Inventors
William W. Eaton
Harold T. Olson

Attorney

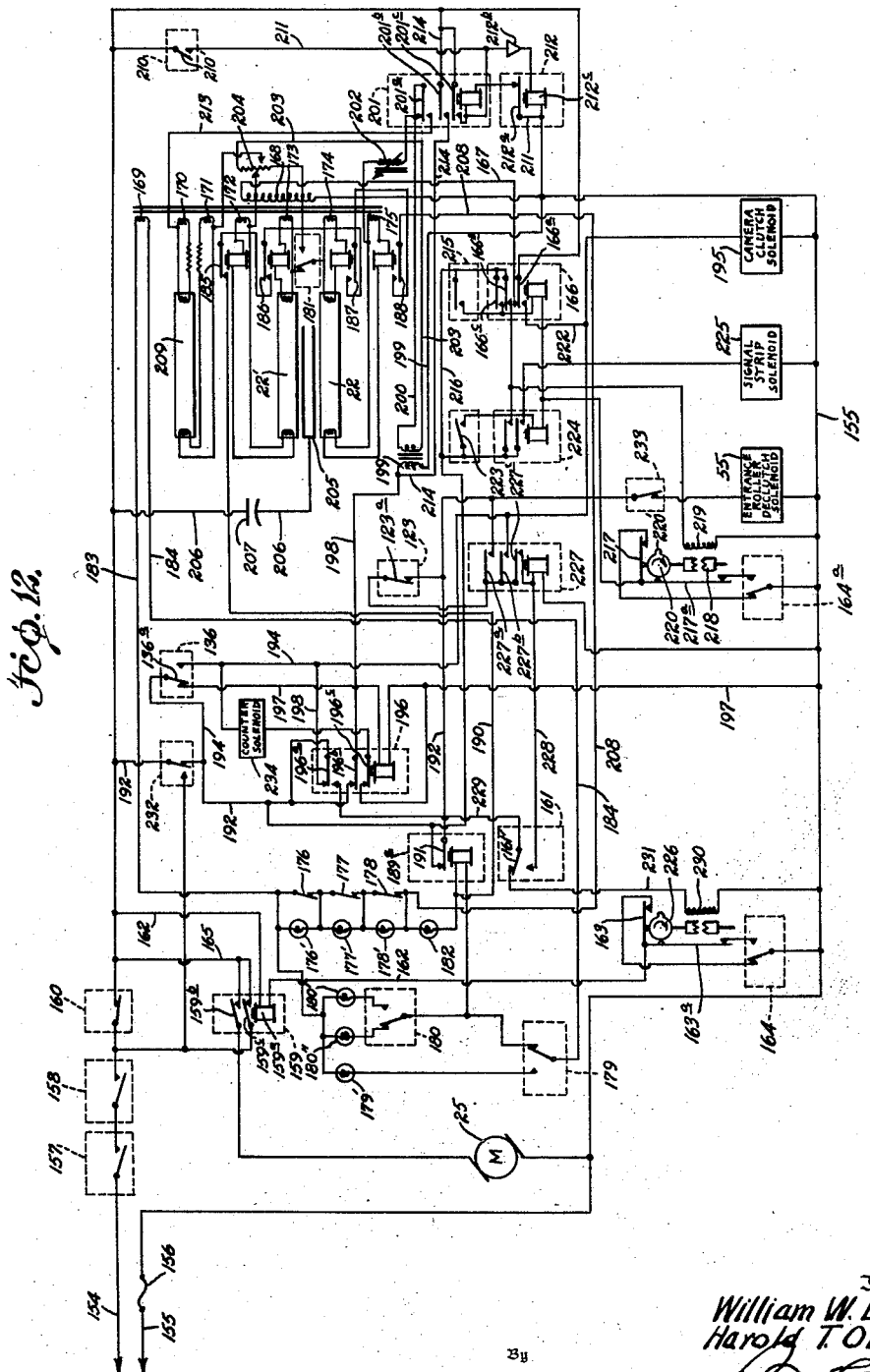

Patented Apr. 27, 1954

2,676,514

UNITED STATES PATENT OFFICE 2,676,514

FLOW FILM PHOTOGRAPHIC APPARATUS

William W. Eaton, Milford, Conn., and Harold T. Olson, Baldwin, N. Y., assignors to Remington Rand Inc., New York, N. Y., a corporation of Delaware Application October 4, 1949, Serial No. 119,525

8 Claims. (Cl. 88—24)

The present invention relates to flow film apparatus and is concerned with the effective utilization of alternating current operated lighting for the illumination of the traveling document in the photographic aperture. The invention is primarily, though not exclusively, directed to the effective utilization of alternating current operated fluorescent lighting for such purposes.

For several reasons it is desirable to employ fluorescent lighting for illuminating documents in the photographic field of flow film apparatus, for example, for a given light intensity fluorescent lighting is much more economical in cost and compactness than incandescent electric lamps, also the latter generate considerably more heat. On the other hand, however, it has been found in practice that fluorescent lighting operated on an alternating current circuit tends to result in document illumination which for flow film photography is uneven enough in intensity to be perceptible on the processed films, such unevenness manifesting itself as cycle marks which are transverse spaced bands caused by density variations produced on the finally processed traveling film. To some extent, especially when operating on current supply systems with a lower frequency than the now fairly standard sixty cycle installations, the phenomenon of cycle lines may occur under certain operating conditions even where ordinary incandescent filament lamps are employed. In general, however, the retention properties of incandescent filament lamps are such that the cycle lines are not unduly obvious on the processed film and may be tolerated if high quality reproduction is not essential.

Though the lighting circuit could, of course, be worked on direct current, the practical difficulties involved as well as other inherent disadvantages suggest that direct current operated lighting in flow film photography, especially where fluorescent lighting is employed, is not a commercially practical proposition. It is believed that for that reason and also on account of the phenomena of cycle lines produced when fluorescent lamps are actuated with alternating current, fluorescent lighting has hitherto proved impractical for commercial applications of flow film photography.

It is an object of the pesent invention to provide flow film photographic apparatus in which the inherent difficulties hereinbefore described, and particularly those hitherto preventing the effective use of fluorescent lighting in such apparatus, are overcome. To that end, in apparatus according to the invention, the effective aperture width is made exactly equal to the distance traveled by a document in a whole number of current cycles. The aperture may be a fixed aperture of the required width but it is preferably adjustable.

The invention will now be described with reference to the accompanying diagrammatic drawings which illustrate the invention as applied to flow film photographic apparatus for double sided document copying, that is to say for photographically copying both the front and the back of each document in its passage through the aperture. In the drawings:

Fig. 3 is an end view of the mechanism shown with the greater part of the casing removed but with its general form mainly indicated in dot and dash lines.

Fig. 4 is a view somewhat similar to Fig. 3 but shows parts of the framework broken away, the better to reveal document feed, aperture and lighting arrangements.

Fig. 5 is a front view illustrating the main structure of the apparatus, certain parts being broken away and other parts being omitted to facilitate explanation.

Fig. 6 is a plan view approximately corresponding to Fig. 5, but with certain parts omitted.

Fig. 7 is a fragmentary detailed cross section through the document feed mechanism in the immediate vicinity of the aperture.

Fig. 8 is a fragmentary front view showing a typical arrangement for aperture width adjustment and corresponds with the showing of Fig. 7.

Fig. 9 is a fragmentary front view partly broken away and partly in section to illustrate the detail of latch mechanism operable to give access to the document feed mechanism.

Fig. 10 is a fragmentary end elevation corresponding with the showing of Fig. 7 but looking at that part of the apparatus from a direction opposite to that from which it is viewed in Fig. 3.

Fig. 12 is a circuit diagram showing the theoretical electrical circuit of the apparatus.

Before proceeding with the description of the apparatus which is the subject of the present invention, it is thought desirable first to explain the phenomenon which results in the production of the undesirable cycle lines.

Figure 1:
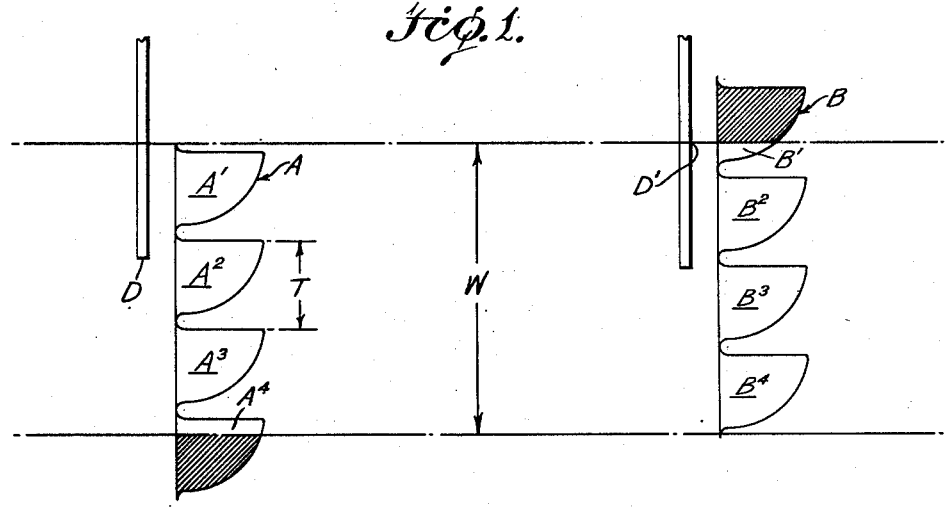
Fig. 1 is a theoretical plotting of two different relations of a cycle to a haphazardly chosen aperture, the plot being representative of variation of light intensity against time.

In flow film photography the document is illuminated while it passes through the aperture which is constituted by a rectangular slot and the image is focussed for recording on the moving film in the camera. The total exposure for any given portion of the document is therefore roughly proportional to the product of the illumination multiplied by the time taken by that given portion of the document in traveling across the aperture. With fluorescent lamps working on an alternating current circuit however any given point of the document in the aperture is subjected to a continuously varying illumination intensity which is graphically represented at A in Fig. 1 by a schematic plot of lamp intensity against time, where the leading edge D of a document enters the top of the aperture at the beginning of a cycle. The frequency of the recurring cycles can be represented by a cycle time T which in the case of the now commonly employed operating frequency of 60 cycles is $1/120$ of a second between periods of maximum intensity, between which periods there is an appreciable falling off in intensity of the illumination. The aperture is represented in Fig. 1 as being of width W, and in its travel across the aperture the document will be illuminated by several successive cycles. As represented at A, the leading edge D of the document gets the benefit of three complete successive cycles A1, A2, A3, plus the unshaded portion A4, of the fourth cycle, the remainder of which fourth cycle is cut off as the leading edge D passes out at the bottom of the aperture during the fourth cycle. A subsequent point D1 of the document seen in relation to the plot B enters the aperture in such a relation to the first cycle that it gets the benefit of the unshaded part B1 of the first cycle plus all of each of the three subsequent cycles B2, B3 and B4. The total exposure of any given point of the ducument is, of course, the instantaneous intensity as represented graphically by the area of the unshaded portions under the curves A and B and it will be evident that those integrals are not equal, because, though the time factor is the same in respect of A4 and B1, the total effective illumination during that time is perceptibly different. The difference in total exposure to which the points D and D1 of the document are subjected must manifest itself as corresponding variation of the image density on the finally processed film, and it is in that way that the cycle lines are produced. Since probably the main application of flow film photography for commercial purposes is in the microfilm copying of documents such variation cannot be tolerated and it is believed that the apparatus according to the present invention is the first commercially used which employs alternating current operated fluorescent lighting successfully for such purposes.

Figure 2:
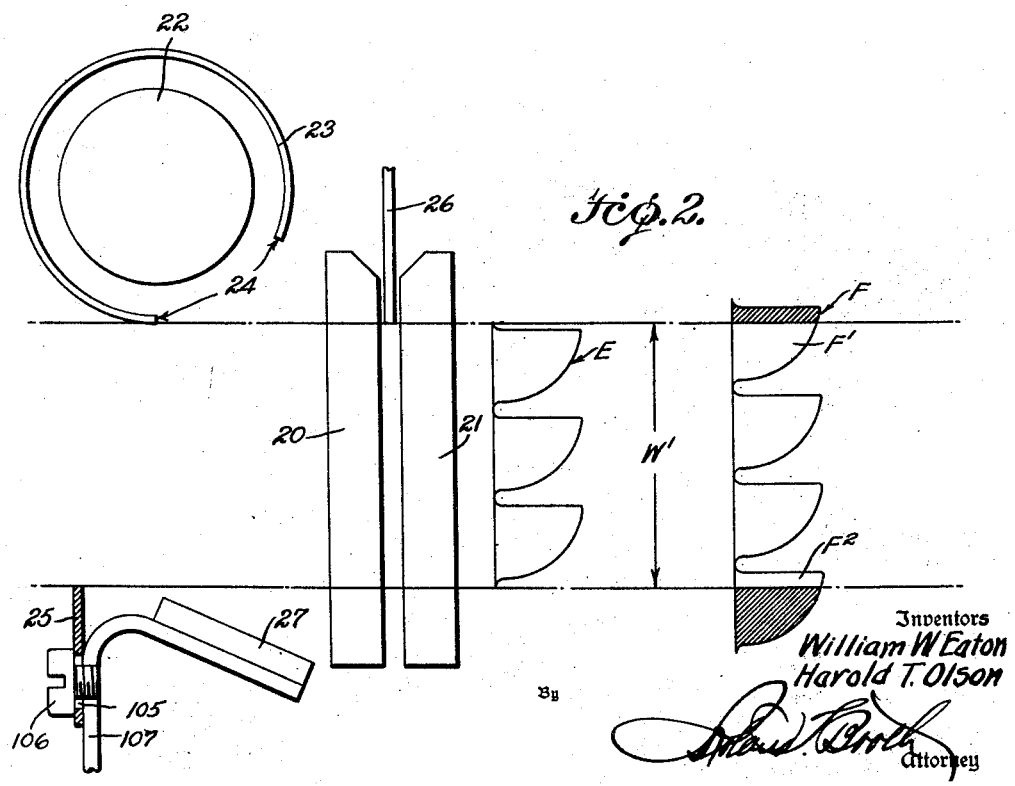
Fig. 2 is a somewhat similar theoretical plotting showing the relationship between two cycles when the effective aperture width is correctly chosen in accordance with the teachings of the present invention, but in this showing an effective embodiment of the aperture and a typical arrangement of fluorescent tube lighting is also embodied.

The invention centers around the discovery that—provided the illumination is constant across the aperture—the cycle lines can be eliminated by using an aperture width exactly equal to the distance traveled by the document in a whole number of current cycles. That is to say, working on 60 cycle alternating current with peak intensities occurring at time intervals of $1/120$ of a second, in a time $X/120$ seconds, where X is a whole number. That is true because, under those conditions the time integral of light intensity is then the same for every point on the document regardless of its relationship to the current cycles at the instants of entering and leaving the aperture. By way of illustrative explanation attention is now directed to Fig. 2 wherein there is seen on an enlarged scale the plates 20 and 21 between which the document is illuminated by the fluorescent lamp 22 mainly enclosed by the tubular lamp casing 23 so that light is concentrated and projected through the slot 24. The aperture width is clearly indicated in Fig. 2 by reference W1 as defined between the lower extremity of the tubular lamp casing 23 and the upper edge of the plate 25. The graphical plot E shows the relationship when the leading edge of a document 26 enters the aperture precisely at the beginning of a cycle. In that event the document is illuminated in its passage across the aperture by the integral of three successive cycles and no more. An immediately subsequent point of the document entering the aperture in the relation to a current cycle plotted at F gets the benefit of the unshaded portion F1 of the first cycle and all of the next two subsequent cycles plus the unshaded portion F2 of the fourth cycle. It will be evident that the shaded portion missed at the beginning of the first cycle is exactly compensated by the unshaded portion F2 picked up at the beginning of the fourth cycle, and that will always be so provided the correct relation between aperture width and document speed is maintained, and the integral of intensity will be the same for all points of the document.

To facilitate final accurate adjustment of the aperture width it is preferred that the plate 25 shall be adjustable.

On a basis of an exposure time of about $1/40$ of a second, known in relation to film sensitivity the available light intensity and a rate of film and document feed for which the machine is designed, and which it so happens can be written as $3/120$ of a second, thus corresponding exactly with a whole number of current cycles in the case of 60 cycles alternating current, the correct aperture width can be calculated from:

$$S=\frac{W}{t}$$

Where S represents the velocity of document feed across the aperture, W represents the aperture width, and $t$ represents exposure time written as the nearest whole number integral of current cycles. Thus by substitution and by way of example, where:

$S=25$ inches per second representing a known rate of document feed, and $t=3/120$ of a second:

$$W=25\times\frac{3}{120}=\frac{75}{120}=.625''$$

In actual practice the exposure time is the variable which can be manipulated by using film of increased sensitivity and/or varying the total intensity of illumination, for which latter purpose provision is anyway nearly always provided in the form of a rheostat control, whereby the degree of illumination can be varied to compensate for varying contract in the original documents to be copied.

Once the aperture width has been correctly calculated minor fluctuations in the cycle time, such as is apt to occur, is unlikely to result in reintroduction of the phenomenon of cycle lines provided a common source of alternating current is used for illumination and for film and document drive, for in that way any variation in the illuminating circuit manifests itself as corresponding variation in the rate of film and document feed.

The foregoing conclusions are not strictly true if the total intensity across the aperture is not uniform since, in general, the amount of integrated exposure lost at the first current cycle in such an event will not be equal to that gained at the last cycle. The variation however is insignificant if the illumination distribution across the aperture is symmetrical with respect to the center. Such a symmetrical distribution can be achieved by the use of an additional lamp symmetrically placed opposite the lamp 22 of Fig. 2, but in practice the inclined mirror 27 can be utilized to throw light from the lamp back onto that side of the aperture remote from the lamp 22 whereby to compensate for any falling off of instantaneous intensity across the aperture.

The general layout of the flow film photographic apparatus developed according to the present invention for simultaneously microfilm copying both sides of a document in the aperture will now be described with reference to the remaining Figs. 3 to 12 inclusive. Thus, as best seen in Figs. 3, 4 and 5, the electric motor 28 drives the pulley 29 on the jack shaft 30 through the belt 31. From a pulley 32 on the jack shaft a belt 33 drives the pulley 34, see Fig. 5, and thereby the auxiliary shaft 35, on the other end of which is a pulley 36 having a direct connection through the belt 37 with the pulley 38, see Fig. 3. Behind the pulley 38 is a pinion 39, see Fig. 5, having a geared connection with a pinion 40, see Fig. 3, on the shaft 41, see Fig. 4, of the driven feed roller 42. A roller 43 on a shaft 44 cooperates with the driven feed roller 42 for document feed. On its outer end the driven feed roller shaft 41 is provided with an annular boss 45, see Fig. 3, which transmits frictional drive to an annulus 46 on an entrance roller shaft 47 through the intermediate clutch actuated roller 48 mounted on the arm 49. The arm 49 is pivotally connected at 50 to the clutch lever 51 which in its turn is swingable about the pivot 52. The path of movement of the arm 49 is further controlled by the provision of a slot 53 in the arm for sliding engagement with the fixed pin 54, see Fig. 3, and the arrangement is such that under certain conditions of operation, as will later be understood energization of the clutch control solenoid 55, see Fig. 3, swings the lever 51 clockwise about its pivot 52 and thus withdraws the roller 48 from its drive transmitting engagement between the annuli 45 and 46. In the position in which the parts are seen in Fig. 3 however, the clutch roller 48 transmits drive from the annulus 45 to the driven entrance roller shaft 47 through the annulus 46. A pressure roller on the shaft 56 cooperates with a roller on the shaft 47, the shaft for the entrance end feed rollers being supported in the turret formation constituted by the side support members 57 and 58 upstanding from the main chassis member 59.

The general relation of the document feed mechanism, the aperture, fluorescent lighting means for illumination of a document in the aperture, and the roller drive will be clearly understood by comparison of Figs. 3 and 4. Since, however, Figs. 3 and 4 show the apparatus to a very reduced scale, it is desirable now to refer to Fig. 7 which illustrates the aperture, lighting arrangements and the document feed mechanism in the immediate vicinity of the aperture to a very much larger scale. In Fig. 7, the transparent plates 20 and 21 defining the aperture, the lamp 22, tubular casing 23 with its slot 24, the aperture adjustment plate 25 and the mirror 27 are seen in the relationship already discussed with reference to Fig. 2. Since the embodiment of the invention now being discussed is concerned with double sided document photography, a similar arrangement is provided at the opposite side of the aperture for illumination and aperture adjustment, such arrangement however is similar and symmetrical and the corresponding parts are indicated with the same reference numerals primed. The arrangement and disposition of the entrance rollers on their respective shafts 47 and 56 is clearly seen in Fig. 7 and it can here be stated that the entrance rollers are not continuously cylindrical but as seen with reference to Fig. 11 have their effective peripheral surfaces constituted by spaced annuli, of which the center annulus indicated in Fig. 7 by the reference numeral 60 is formed as a frusto-spherical surface the center portion of which makes line contact with the cooperating annulus 61 of the driven entrance roller. The arrangement of the entrance rollers is in fact similar to that described in the copending application Serial No. 895 of Frederick J. Shutt filed on January 7, 1948, and provides in conjunction with straightening fingers 62 in spaced relationship on the shaft 63, a means for straightening a document into a position in which its leading edge is located truly tranversely relative to the direction of document feed before the document enters the aperture.

In operation of the document feed mechanism, a document is fed manually or by mechanical sheet feeding means so that about the center of its leading edge is received between the annuli 60 and 61 of the entrance rollers. The annulus 61 of the driven entrance roller rotates anticlockwise as viewed in Fig. 7 and the annulus 60 normally has point contact as above described with the driven annulus 61 and thus rotates clockwise as viewed in Fig. 7 so that, when the leading edge of a document is engaged between the annuli, it is fed downwardly through the guide 64 constituted by the laterally spaced pairs of suitably curved slats 65 and 66. At the entrance end of the guide, the slats 65 and 66 project into the grooves between adjacent annuli from the entrance rollers and the function of the guide is to guide the document in its passage from the entrance rollers into a position for entry between the feed rollers 42 and 43. Spring means act on the shaft 63 so that the straightening fingers 62 are normally projected into the spaces between the adjacent pairs of slats 65 and 66. If a document should be fed between the annuli 60 and 61 with its edge not truly transverse to the intended direction of document feed, the leading portion of the leading edge of the document engages a straightening finger laterally spaced to one side of the cooperating annuli 60 and 61. The spring loading acting on the shaft 63 is such that, having regard to the point contact of engagement of the annulus 60 with the document, further travel of the leading portion of the leading edge is arrested until the leading edge as a whole engages all the straightening fingers 62, whereafter the force of the feeding action then becomes sufficient to overcome the spring loading and swing the fingers 62 and the shaft 63 as a whole clockwise out of the path of document feed. At its lower end the guide 64 presents the leading edge of the document to the feed rollers 42 and 43, and the document feed is continued so that it enters the open upper edge of the slot between the plates 20 and 21 which define the aperture. Continued operation of the document feed mechanism feeds the document through the aperture, and its leading edge, after passing out at the bottom opening between the plates 20 and 21, is received between the merging belt runs 67 and 68 engaged over the respective rollers 69 and 70. The belts 67 and 68 are driven as will later be understood for operation as means for conveying the document from the aperture to some convenient remote point at which it is discharged from the machine. Meanwhile however it will be seen that the shafts 71 and 72 mount fingers 73 and 74 respectively, which are engaged by the document prior to its entry into the aperture. The feed rollers 42 and 43, like the entrance rollers, are each formed by the spaced annuli cooperating for document feed and an end plate 75 mounts depending fingers 76 which project between the annuli of the roller 43 to terminate adjacent the upper limit of the aperture. The shafts 71 and 72 are spring loaded so that the respective sets of fingers 73 and 74 are normally interdigitated with the fingers 76 but the arrangement is similar in nature and function to that of the fingers 62 and shaft 63 except that the fingers 73 and 74 are on the opposite side of the path of document travel and cooperate with fingers 76. A switch is associated with the shafts 71 and 72 which is actuated to ensure that as the fingers 73 are forced back anticlockwise out of the path of document feed, a relay circuit is completed which, with a slight delay, completes the lighting circuit for the lamps 22 and 22'. The details for the lighting circuit will be described later but for the present it suffices to explain that a slight delay is provided by operation of the relay circuit; the arrangement is such, however, that the lamps are fully effective for illumination of a document by the time its leading edge reaches the upper limit of the aperture. The fingers 74 are similarly actuated and cannot return to the Fig. 7 position until the trailing edge of the document has passed. The shaft 72 controls mechanism to actuate the lamp switch for breaking the relay circuit, and the corresponding operational delay of the relay ensures that the lamps remain lighted until the trailing edge of the document has passed out at the bottom of the aperture.

Incidentally, it will be observed that in addition to their switch actuating function, the fingers 73 and 74 also cooperate with the vertical guide fingers 76 to maintain the document substantially flat and vertical for proper presentation of its leading edge to the aperture slot.

The foregoing description dealing with the operation of the feed mechanism for feeding a document into, through and out of the aperture and by reference to Figs. 3, 4 and 5, it will be seen that the belts 67 and 68 provide a conveyor belt system between which the document is taken for delivery out of the machine through the discharge chute 77, see Figs. 3 and 4, into a receiving tray, not shown, conveniently placed under the head fitting 78.

The belts 67 and 68 are preferably not continuous across the width of the document feed path but are in the form of spaced strips running on rollers. The path of the belts is seen with reference to Fig. 4, wherefrom it will be seen that the rollers 70 already discussed in connection with Fig. 7, forms one terminal for the endless belts 68, the other terminal of which is the roller 79, which is driven for rotation anticlockwise as viewed in Fig. 4. Tracing the path of the belt 68 from the drive roller 79 of Fig. 4, it will be seen that it proceeds as a downward flight passing under the tensioning roller 80, under the idle roller 81, over the roller 70, best seen in Fig. 7, returning under the roller 82 and roller 83 back to the drive roller 79. With anticlockwise rotation of the drive roller 79, as viewed in Fig. 4, therefore the direction of travel of the belt 68 is anticlockwise. On the other hand, the direction of travel of the belt 67 is clockwise and it will be seen from Fig. 4 that it engages around the right-hand upper sector of the drive roller 79 and therefore derives its drive therefrom. Tracing its path from there in the direction of rotation, the belt 67 engages over the upper end rollers 84 and 84a continuing down under the tensioning roller 86 and also under the roller 87 from which it runs upwardly over the roller 69 returning under the rollers 82 and 83 to the roller 84. The lower run of the belt 68 and the upper run of the belt 67 thus move in contact with each other defining a continuous path for document conveyance, first downwardly from the aperture then rearwardly to the back of the machine and then upwardly for final forward discharge through the chute 77.

As best seen from Fig. 5, the pulley 85 on the shaft of the drive roller 79 of the conveyor belt system is driven by the belt 85' from the shaft 35 which also drives the entrance rollers 60, 61 and the feed rollers 42, 43, all of which are thus directly driven from the jack shaft 30, making it possible to ensure that all the members which cooperate for document feed can operate at a common peripheral speed to afford a predetermined rate of document feed throughout the machine.

Certain details of the roller construction and their mounting are apparent from comparison of Figs. 4, 5 and 6. In that respect it will be seen from Fig. 6 that the rollers 80, 87, 81 and 86 are grooved and the belts 67, 68 run in the grooves so that the lower flights of the conveyor belt system are constrained to run in exact alignment with the intended path of document feed. That is an important feature because it will be appreciated that the leading edge of a long document may be in the early stages of the conveyor belt system while its trailing end is still in the aperture, and misalignment of the belts 67 and 68 might tend to skew the trailing part of the document and so distort the image produced on the traveling film. It is also noteworthy that the intermediate rollers 80, 81, 83 and 86 are cantilever mounted in center bearings, those for the rollers 80, 81 and 83 being carried by the web 88 on the underside of the main chassis plate 59. The cantilever mounting of the intermediate rollers is a considerable structural advantage from the installation and servicing point of view because, when the apparatus is enclosed by its casing as will later be explained, they are not easily accessible. The cantilever mounting is thus of advantage to the extent that the endless belts 67 and 68 can be disengaged from the intermediate rollers without the necessity for removing the rollers themselves.

The foregoing description has now explained the document feed right through from entry into the apparatus at the entrance rollers to its final discharge from the chute 77 and it is now necessary to explain how the illuminated apertured image is reflected and focussed onto moving film in the camera. Attention is therefore now directed to Figs. 4, 5 and 6. There the camera is seen in dot and dash lines in Fig. 5, indicated by the reference numeral 89. The camera 89 is the subject of an application of Harold T. Olson Serial No. 119,529 filed concurrently herewith but it suffices for the purpose of the present disclosure to state that it contains film drive mechanism in the form of reduction gearing and rests upon the camera support base 90 which is a substantial casting suspended from the main frame member 59. Means are provided for locking the camera to its support base and when in position the lens assembly diagrammatically indicated at 91 is directed downwardly and the image projected onto the moving film in the camera is that of the reflecting surface of the inclined mirror 92 seen through the slot 93 of the camera support base 90.

Camera locating means are provided in the form of the guide brackets 59', see Figs. 5 and 6, attached to the chassis plate 59, and since exact location of the camera 89 is of paramount importance, the camera is provided at its underside with holes which engage the pegs 90', see Fig. 6 provided in the camera support base. Since, however, the pegs 90' will be concealed by the camera as it is being inserted the guide brackets are formed with downwardly tapering slots 59'', see Fig. 6, for cooperation with pegs projecting from the ends of the camera to facilitate its correct functioning. Micro-switch means are also preferably provided on the support base 90 for actuation to complete the operating circuit only when the camera is in position and when it is loaded with film. Electric contact means are provided within the camera for indicating when the film supply is nearly used up, when the receiving spool is full, or when a film feed defect develops. Terminal connection for such means are mounted with switch actuating plungers on the insulated bases 90'', see Figs. 5 and 6, on top of the camera support base.

Reverting to the other end of the apparatus, the mirrors 94 and 95 are inclined at an angle of approximately 45 degrees, the former in front and the latter behind the aperture. The mirrors themselves are perhaps best seen with reference to Fig. 6 but there the aperture, lamps and document feed mechanism in the vicinity of the aperture have been omitted, and their relation to the aperture at the first stage is clearly indicated in Fig. 4 and fragmentarily in Fig. 7. The traveling image of the front of a document in its passage through the illuminated aperture is reflected onto the front half of the reflecting surface of the inclined transverse second stage mirror 96. The traveling image of the back of a document is simultaneously reflected by the mirror 95 through the clear glass plate 97 onto the rear half of the reflecting surface of mirror 96, and thus the back and front images appear side by side on the reflecting surface of the second stage mirror 96. As will be seen in Fig. 5, the second stage mirror 96 reflects the images onto the reflecting surface of the third stage mirror 98 from which the images are picked up by the fourth stage mirror 92 already referred to and reflected thereby through the lens which focuses the two images in side by side relation on the traveling film.

The clear glass plate 97 interposed between the first stage mirror 95 and second stage mirror 96, does not interfere with the reflection of the image of the back of the document onto the second stage mirror 96 and the function of the clear glass plate 97 is to reflect index data from the illuminated index projector 99 into the optical path of the second stage mirror 96 for periodically recording index data on the film. The index data is however applied by a manual control when the film is stationary and the mechanism and the method of operating it are described in the copending application Serial No. 119,526, now abandoned, of William W. Eaton and Harold T. Olson filed concurrently herewith.

It may be stated that the employment of four reflecting stages as above described provides a long optical path which is very desirable in double sided document photography where the images are to be photographed side by side. In that respect, it will be appreciated that for such purposes it is necessary for the camera lens to cover an angle somewhat greater than twice that required to cover the image of one side alone at the same distance. Provision of a long optical path in the arrangement according to the present invention however makes it possible to take advantage of the improved definition at smaller angles of coverage. The arrangement of the mirrors and the mechanism of the apparatus as a whole also enables the machine to be shaped for final enclosure in a casing which presents many advantages from the operational point of view as will later be understood with reference to Fig. 11.

The camera drive for film feed is taken off the pulley 100 on the end of the jack shaft 30, see Fig. 5, through the belt 101 engaging over the pulley 102 on the countershaft 103 which drives through bevel gearing a vertical shaft leading up to the flexible coupling 104 projecting through the camera support base 90. It will be appreciated that since the film drive is thus taken off the jack shaft 30 from which document feed drive is also derived, the jack shaft is virtually the master driving member and the exact rate of document feed can be calculated from the jack shaft R. P. M. having regard to the fact that the drive ratio in the document feed stage is known. Knowing the exact rate of document feed the aperture is proportioned accordingly, for example as seen with reference to the fragmentary showing in Fig. 8 where the aperture adjustment plate 25' is provided with end slots, one of which is indicated by the reference numeral 105 and through which the adjustment screw 106 engages support 107, see also Fig. 7, for one end of the mirror 27'. The ends of the casings 23 and 23' for the tubular lamps are rigidly secured in the walls 57 and 58 and therefore the lower extremities of the casings cooperate with the upper edges of the respective aperture adjustment plates 25 and 25' to define the aperture quite positively. The terminal connections for the lamps are preferably in the form of disconnectable rubber connectors each formed with an annular portion to engage in the open ends of the casings 23 and 23' for proper location of the lamps within the casings. Openings are provided in the end walls 57 and 58 through which the lamps are accessible for inspection, cleaning and replacement.

For correct positioning of the plates 20 and 21 the plates are preferably joined at their ends for removal as a unit and are located by end frames attached to the end walls, the frame on the end wall 58 being indicated in Fig. 7 by the reference numeral 19. The unit constituted by the plates 20 and 21 is also removable for cleaning through an opening in the outer end wall 58, see Fig. 3, and a micro-switch, not shown, is provided on the opposite end wall 57 which is actuated to complete the operating circuit only when the plate unit is correctly installed thereby to ensure that the apparatus cannot be operated with the plate unit out or incorrectly inserted.

In the previous explanation of the operation of the document feed in the immediate vicinity of the aperture certain constructional details were omitted and it is desirable that they should now be explained. In that respect attention is now directed to Figs. 7, 9 and 10 taken in conjunction with each other. One such detail is concerned with the facility for gaining access to the document feed mechanism in the immediate vicinity of the feed rollers 42 and 43 should it be necessary for removing a document which having passed the entrance rollers does not properly engage between the feed rollers 42 and 43. The shaft 63 which mounts the straightening lever 62, the shaft 44 of the feed roller 43 and the assembly of fixed guide fingers 76 are mounted by plates one at each end, one of which is best seen at 108 in Fig. 7, and the arrangement provides an assembly pivoted to swing about the shaft 109. A tubular housing 110 extending between the cooperating end plates 108 encloses the bolts 111 and 112 which have operating members 113 and 114 respectively projecting out through the respective slots 115 and 116 and a spring 117 urges the bolts outwardly for engagement with appropriately spaced holes in the end walls 57 and 58 to secure the pivoted assembly in the full line operative position of Fig. 7. Thus if access is required to the feed mechanism the operator can grip the bolt actuating members 113 and 114 to retract the bolts and swing the pivoted assembly into the dot and dash line position of Fig. 7.

Another detail feature of the document feed mechanism omitted from the aforegoing description concerns the provision of a double document control, the function of which is to interrupt the feed if two documents are engaged between the entrance rollers simultaneously. Like the arrangement and operation of the straightening fingers, the double document control of the apparatus according to the present invention is very similar in nature and function to the double document control described in the aforesaid Shutt application Serial No. 895. It is desirable that the double document control should now be briefly described. In that respect, the mounting of the entrance roller shaft 56 in the end wall 58, see Fig. 3, is such as to permit limited rocking action about that end of the shaft, and, with the weight of the assembly, the center annulus 60 of the pressure roller engages the cooperating annulus 61 of the driven entrance roller so that, when a document is engaged between the entrance rollers, the annulus 60 separates from its peripheral engagement with the annulus 61 and the end of the shaft 56 swings upwardly about its bearing in the end wall 58 being guided in a suitably shaped slot in the end wall 57. As will be seen from Fig. 10, which is a view looking on the outside of the end wall 57, it will be seen that the end of the shaft engages in the slot 118 of the end wall 57 and is urged downwardly toward the bottom of the slot by the tension springs 119 and 120. A bracket 121, mounted to rock about the pivot 122, carries a micro-switch 123, having a switch actuating arm 124, swingable about its pivot 125 on the bracket. At its free end the bracket 121 has a depending projection 126 for engagement with the cam 127 which can be rotated by means of a thickness gauge adjustment wheel 128 to adjust the angular relationship of the bracket 121 about its pivot 122. The tension spring 129 operates to hold the projection in engagement with the cam and it will be seen that if the adjustment wheel 128 is turned clockwise as viewed in Fig. 10, the increasing lift action of the cam 127 will raise the free end of the bracket 121 correspondingly. It will be apparent that a very slight movement of the shaft 56, in the direction of the arrow shown in Fig. 10, will actuate the micro-switch 123 but if the free end of the bracket is raised as above described, a greater movement of the shaft 56 in the direction of the arrow will be required to actuate the switch. Actuation of the micro-switch 123 is utilized to energize the solenoid 55, see Fig. 3, for interrupting the drive of the entrance roller shaft 47, and it will therefore be appreciated that the cam 127 can be set to accommodate a document of predetermined thickness between the annuli 60 and 61 without actuation of the micro-switch 123. On the other hand, if two documents of the predetermined thickness get between the annuli 60 and 61 in overlapping relationship, the excessive movement of the switch actuating end of the shaft 56 will immediately result in actuation of the micro-switch with corresponding energization of the clutch control solenoid 55 for interrupting drive of the entrance rollers.

The rate of document feed is fairly rapid and since, in its operation to prevent two documents getting into the region of the aperture in overlapping relationship, it is important that operation of the double document control switch shall immediately stop drive of the entrance roller shaft 47, a pawl and ratchet arrangement is provided, in which respect attention is now again directed to Fig. 3. As was previously explained, with reference thereto the solenoid control clutch actuating lever 51 swings clockwise about its pivot 52 with energization of the solenoid to withdraw the clutch roller 48 from its drive transmitting engagement between the annuli 45 and 46. The drive to the driven entrance roller shaft 47 is thus interrupted, but overrunning of the shaft 47 might still result in undesirable continuation of document feed. To prevent such overrunning, the upper end of the clutch actuating lever 51 is coupled to the pawl 130 which is pivotable about a projection extending out from the wall 58. The pawl is normally held in the disengaged position by the tension spring 131 and with energization of the solenoid swinging the clutch actuating lever 51 about its pivot 52, the free end of the pawl is projected into engagement with the teeth on the ratchet wheel 132 on the end of the shaft 47 so that the shaft 47 thus stops instantly. In that way it is impossible for two documents to pass through the entrance rollers, and rejected documents can be withdrawn from the intake side of the entrance rollers without having to open up the casing for access to the interior of the apparatus. Moreover, it is only the entrance roller drive which is stopped by the double document control and any document still in the machine will be fed and photographed without interruption. The feed rollers 42 and 43 need not necessarily be yieldably mounted for it suffices to provide them with a resilient layer of rubber or other suitable material as indicated by the section of Fig. 7.

Fig. 10 also serves to show the arrangement of levers 133 and 134 respectively on the ends of the shafts 71 and 72 which are document actuated through the respective sets of fingers 73 and 74. It will be seen that the actuating arm 135 of the illuminating circuit switch 136 is connected to the actuating lever 133 by the bolt 137 and thus, with rotation of the lever 133 anticlockwise as viewed in Fig. 10, against resistance of the spring 138 as the fingers 73, best seen in Fig. 7, are forced back by the document, the switch 136 will be actuated for completing the illuminating circuit. The lever 134 is connected to the switch actuating arm 135, and as the fingers 74, best seen in Fig. 7, return under the influence of the spring 139, Fig. 10, as the trailing edge of the document passes, the switch will be actuated to break the circuit.

It will be appreciated that the main chassis plate 59, the camera support base 90, its suspension and the supports for the mirrors constitute a rigid chassis structure which tends to eliminate any possibility of vibration of the camera relative to the aperture. The chassis as a whole can be suspended from the rectangular girder frame 140, best seen in Figs. 5 and 6, which can be welded or otherwise secured in a casing of sheet metal of substantial gauge. The motor as seen in Fig. 3 can be similarly mounted preferably remotely and quite separately from the chassis to eliminate the possibility of motor vibration being transmitted to the chassis.

Figure 11:
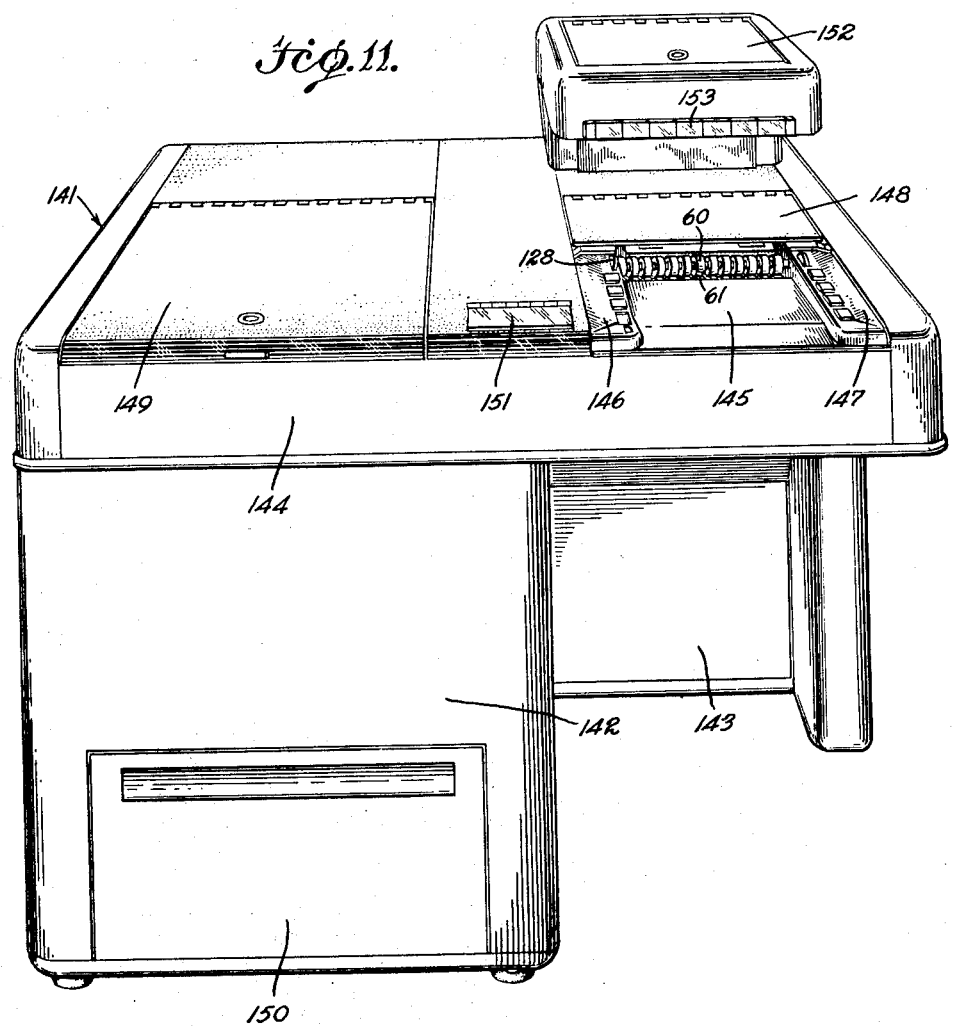
Fig. 11 is a front perspective view of the apparatus according to the invention.

The general arrangement of document feed, the drive, the optical system, camera mounting etc., is such that the mechanism may be installed in a casing which is very convenient from the operational point of view. Thus the casing as seen in Fig. 11 can take the form of a desk presenting a flat upper surface at normal desk level so that an operator can work seated or standing as he or she may desire. Since there is no appreciable projection of mechanism below the chassis plate on the entrance side of the document side of the document feed mechanism, space is available to accommodate the knees of a seated operator.

As will be seen from Fig. 11, the casing, generally indicated by the reference numeral 141, has a substantial trunk portion 142 from front to back at the left-hand side of the machine. The trunk portion serves to enclose the camera compartment, the second, third and fourth mirror stages, the camera and its drive mechanism. Since the motor 28 is located at the back on the right-hand side of the machine it is not necessary for the motor casing 143 to extend to the front of the machine, which feature makes it possible not only to provide the knee space under the right-hand front portion of the machine, but also to eliminate any leg or supporting structure extending down to floor level at the right-hand front end. That latter feature is highly desirable because many operators find it easier to feed documents rapidly from the side of the machine and with the elimination of any structural member at the outside of the knee space, it is possible for an operator to move quickly to the side of the machine without rising from a seated posture.

The girder frame member 140 can be accommodated within the depth of the desk top portion 144.

The downwardly inclined slightly recessed panel portion 145 of Fig. 11, and also fragmentarily indicated in Fig. 4, provides a convenient support for documents being fed into the entrance rollers, and when mechanical sheet feeding means are employed such means can be supported on the panel 145. The side panels 146 and 147 serve for mounting the various controls in the form of press button switches, the adjustment wheel of the double document control already described and a similar adjustment wheel for an illumination intensity control operable to compensate for various document contrasts or different film sensitivities. Access doors are provided through which the internal mechanism can be reached, for example, 148 indicates a hinged access door through which the pivoted assembly embodying the rear feed roller 43 can be reached; the door 149 gives access to the camera compartment; the drawer 150 at the front of the trunk portion 142 gives access to the third and fourth mirror stages for cleaning and adjustment. 151 indicates a hinged cover plate which is preferably transparent and provides for access to the index unit referred to in connection with Fig. 6 and also seen in end elevation in Fig. 3. The hinged door 152 on the top of the head fitting 78 enclosing the upper part of the discharge end of the conveyor belt system, gives access to the discharge chute 77, seen in Figs. 3 and 4 and can be opened or removed to provide for attachment of an endorser unit as described in the aforesaid application of the applicants hereof Serial No. 119,529 filed concurrently herewith. An access door is also provided at the right-hand end of the desk top portion 144 through which the aperture plate assembly 20, 21 and the lamps 22 and 22' are accessible. Additionally, it is preferable that the back panel shall be removable as a whole to facilitate access to the drive mechanism.

The reference numeral 153 indicates a transparent panel behind which is located a series of pilot lights which operate to give visual signals. For example, appropriate pilot lights, light up when film on the supply spools is nearly running out, when the receiving spool is nearly full, or if the aperture plate or the camera is not correctly installed. It is also desirable that a pilot signal light shall indicate whether the camera is loaded for double sided or single sided photography, which conveniently can be achieved by substituting different cameras having appropriate circuits made through the contacts on the camera support base 90.

The over head discharge leaves the discharged documents accessible for collection at desk level and from the seated position the indicator panel 153 is very apparent. The absence of any ground engaging support at the right-hand front part of the machine in no way interferes with the steady supporting of the machine on the floor since there is little or no mechanism of any substantial weight enclosed by that part of the casing, and consequently the center of gravity of the machine as a whole is on the other side of a diagonal extending between the left-hand front corner and the right-hand rear corner of the casing.

The electrical circuit of the apparatus will now be described with reference to Fig. 12.

In Fig. 12 the circuit is shown in a condition which corresponds to an idle setting of the machine ready for operation.

The main power supply lines are indicated at 154, 155 with the usual fuse 156 in the line 155. To prevent possibility of fogging the traveling film in the camera and also for reasons of safety, switches are provided on all access doors, but for the purpose of the diagrammatic showing they may be illustrated as embodied, with the exception of two switches actuated by the camera access door, in the single switch showing indicated at 157. The main on and off switch is indicated at 158. The camera door access switches are indicated at 160 and 161. With the circuit appropriately completed through the access door and camera switches, the main power relay 159 is actuated by the start reset switch 232 as will later be understood. The motor here indicated by the reference numeral 28 corresponding with its showing in Figs. 3 and 5 drives the jack shaft 30, best seen in Fig. 5, the circuit normally being completed through the line 162 including the electro-magnet coil 159a, the normally closed timer switch 163 and the camera actuated plunger switch 164. With the circuit thus closed through the line 162, the electro-magnet 159a is energized, and the switch contact blades 159b and 159c are actuated to close the power relay circuit with the result that a circuit is completed through the line 165 including the motor 28, and which is thus driven. The line 154 can be traced through to the manual space relay 166 to the movable contact blade 166a thereof, which normally feeds current through the line 167 to the primary winding 168 of the 115 volt transformer, the other end of which is connected to the line 155. With current flowing to the primary transformer winding 168 the 24 volt secondary windings 169, 170, 171, 172, 173, 174, 175 are energized. Energization of the secondary winding 169 results in flow of low voltage current in a control circuit.

The control circuit includes the "camera empty" and "camera full" indicator switches 176 and 177 respectively, the aperture glass position switch 178, which is adapted to open if the aperture glass is out or is incorrectly inserted, and the camera actuated contact switches 179, 180 and 181. The switches 176, 177, 179 and 180 are camera actuated, 176 being associated with the film supply spool and tension control, and 177 with the film receiver spool to indicate when the supply of film is almost run out or when there is no film at all in the camera or when film tension is lost. The switches 176 and 177 are brought into circuit through contacts provided on the insulator blocks 90″ on the camera support base 90, best seen in Figs. 4 and 5, and 179, 180 and 181 are plunger switches also on the camera support base for actuation by the appropriate camera, as are also the camera actuated plunger switches 164 and a corresponding switch 164A later to be described. Switches 176, 177 and 178 each have a pilot light wired in parallel therewith as indicated respectively at 176′, 177′ and 178′. 179 is a plunger switch associated with the camera position light 179′. The switch 180 likewise is a plunger switch which is selectively operated by alternative cameras according to whether the apparatus is being used for double sided or single sided photography and is associated with the pilot lights 180′ and 180″.

It is perhaps convenient here to state that when the apparatus is to be used for double sided document photography a camera is used for 36:1 reduction but if only one side of a document has to be copied such a large reduction is unnecessary and a 19:1 reduction is employed, the rate of film feed being increased correspondingly. Generally, alternative cameras are intended to be available for the alternative reductions and the camera operated plunger switches 164, 164A, 179, 180 and 181 are set up appropriately by coded actuating members provided on the base of the alternative cameras.

In addition to the aforesaid pilot lights, there is also a "lamp out" pilot light 182. The pilot lights are mounted in the apparatus behind the glass panel seen at 153 in Fig. 11, and the arrangement is such that appropriate signals will thus be visible to the operator of the machine.

Provided the circuit is appropriately completed through the switches of the control circuit, the low voltage circuit through the transformer secondary winding 169 will be closed through the lines 183 and 184. Since all the secondary windings 170, 171, 172, 173, 174 and 175 are energized at the same time as the 24 volt winding 169, low voltage current flows for preheating the filaments of the fluorescent lamps here again indicated by the reference numerals 22 and 22′ corresponding to their showing, for example, in Figs. 4 and 8. It will be seen that each lamp filament circuit also includes an electromagnetic relay controlling the respective switches 185, 186, 187 and 188 which switches are normally open but are actuated for closure on energization of the respective relays provided the filaments of the lamps 22 and 22′ are intact. The control relay is thus energized through the line 190 to open the control relay switch 191. Until the control relay switch is opened current could normally flow through the line 192 to the entrance roller declutch solenoid herein again indicated by the reference numeral 55 corresponding to its showing in Fig. 3, but with the closure of the control relay switch 191, the solenoid is deenergized and drive is transmitted to the entrance rollers.

With the setup so far described, closure of the switch 158 with the circuit appropriately completed through all access door switches and the control circuit, the circuit to the motor is completed through the main power relay on momentary actuation of the start reset switch 232 and the motor operates. Documents will not be accepted by the entrance rollers of the machine for document feed, however, until the entrance roller clutch actuating solenoid is deenergized on breakage of the circuit at the control relay switch 189a. If the camera is out of position or has inadvertently not been inserted in the machine, the switch 179 will remain closed in the position shown and the camera position pilot light will light up. With the camera properly installed the switch 180 will be actuated and one of the pilot lights 180′ or 180″ will light up to give a signal indication of whether the machine is operative for single sided or double sided photography, and the switch 181 will dictate whether the filaments of one or both of the lamps 22, 22′ will be brought into the preheating circuit. If any of the switches of the control circuit are open, the control relay will not be energized and though the motor will be driven, the entrance rollers will not be driven for document feed because the entrance roller drive occurs only when the entrance roller declutch solenoid 55 is deenergized with energization of the control relay, which cannot occur if the control circuit is open.

If the machine is fully operative as so far described, a document will now be accepted at the entrance rollers, and as it engages the fingers 73, best seen in Fig. 7, the document actuated switch, here represented again by reference numeral 136 in accordance with its showing in Fig. 10, will be actuated. On actuation of the switch 136, its movable contact arm 136a is swung across from the position in which it is seen in Fig. 12 to complete the circuit from the line 192 through the line 194 including the movable contact arm 136a to the camera clutch control solenoid 195 and the camera is driven from the jack shaft for film feed. Previously with the switch 136a in the position in which it is seen in Fig. 12, the electromagnetic document relay 196 was energized through the line 197, but as the document actuated switch arm 136a is actuated to the circuit to the line 197, the document relay 196 is deenergized, and the switches 196a, 196b and 196c move to their normally closed setting as shown. With closure of the switches 196a and 196b, current flows from the line 194 through the line 198 including the switch contact arms 196a and 196b to the primary winding of the 450 volt transformer 199 connecting the circuit across to the line 155. With energization of the primary of the high voltage transformer 199, high voltage current is induced in the secondary winding and flows through the line 200 including the movable contact arm 201a of the index data relay 201 and the combined choke and variable resistance 202 into the filament circuit of the fluorescent lamp 22. The high voltage ionization current bridges the filaments causing the lamp 22 to be fully effective for illumination, the circuit back to the other side of the secondary of the transformer 199 returning through the switch 181, and from there either direct to the line 203 through the adjustable resistance 204 or, if as seen in Fig. 12 the switch 181 is set for double document photography, through the filament circuit of the lamp 22' for illumination thereof, to the adjustable resistance 204. The fluorescent lamps are thus rendered fully effective for either double sided or single sided photography according to the setting of the switch 181 for appropriate illumination of the document aperture. Conversely, when the document actuating switch 136 is actuated by the trailing edge of the document, the circuit to the primary of the high voltage transformer 199 is broken through the document relay 196 and the illumination circuit is opened.

At this point it is desirable to stress the importance of the lighting circuit and the document relay. In that respect, it will be appreciated that the lamp or lamps, as the case may be, must be fully effective for illumination by the time the leading edge of a document reaches the aperture, and instantaneous ionization is therefore essential on completion of the circuit through the high voltage transformer 199. It is for that reason that the filament circuit was previously kept preheated, and the ionization starter 205 connected to the line 206 including the capacitor 207 is included as an additional aid to instantaneous starting. The document relay 196, including as it does an electro-magnetic actuating member, affords a slight delay in resetting the document relay to break the circuit to the high voltage transformer 199. That is an important feature because the fingers which actuate the document control switch 136 are necessarily on the delivery side of the aperture and, if the high voltage circuit were broken instantaneously as the trailing edge of the document actuated the switch 136, the illuminating circuit would be broken and the lamp or lamps extinguished before the whole of the document had passed through the aperture. The delay however ensures a time lag in actual breaking of the illumination circuit which is adequate to ensure that the trailing edge of the document remains fully illuminated throughout its passage through the aperture. The circuit through the line 190, switches 185, 186, 181, 187 and 188, including the lamp filaments and their appropriate electromagnetic relays returns back to the control circuit along the line 208, and it will be realized that failure of a lamp filament will cause current to flow through the "lamp out" pilot light 182 and the current through coil of the control relay 189 will be decreased, causing it to fall out, with the result that the pilot light 182 will light up giving an appropriate indication of lamp failure and, in addition, the entrance roller declutch solenoid 55 will be energized to declutch the entrance roller drive and prevent entry of any further documents into the machine.

In normal operation of the machine, documents are fed into the machine in rapid succession and the sequence of operations so far described for document feed, film feed and document illumination in the aperture continues. Continued operation can, however, be interrupted by several additional control means.

One such control is constituted by the double document control previously discussed, and which is here embodied in the Fig. 12 showing as the thickness control switch here again represented by the reference numeral 123 corresponding with its showing in Fig. 10. When two or more documents of the predetermined thickness for which the double document control is set, engage in overlapping relationship between the entrance roller annuli 60 and 61, the contact 123a of the switch 123 which is normally open in the position shown, is swung over to close against a fixed contact and complete the circuit to the entrance roller declutch solenoid, with the result that the entrance roller drive is instantly stopped despite the fact that the control relay switch 191 remains closed. Opening of the control relay and the provision of any special signal light is unnecessary because the defect is immediately apparent within the field of the operator's vision and can be corrected by manual withdrawal of the defective documents. Since it is only the entrance roller drive which is interrupted, any documents already in the machine will be processed and conveyed for final discharge out of the machine.

Having copied a number of documents pertinent to a particular matter, for example, documents originating in a certain town under perhaps a certain date heading, it will generally be desirable to index the film and for that reason an index data projector is provided. The index data projector is indicated in Figs. 3 and 6 by the reference numeral 99, and comprises a series of adjustable bands which can be set up manually to provide the desired index data. The data so set up is illuminated by the index lamp 209 which preferably is also a tubular fluorescent lamp. The illuminated image of the index data is reflected across the machine onto the skew glass 97 of Fig. 6 which, due to its angular relationship to the incident image of the index data, operates to reflect the index data illuminated image into the optical path at the reflector 96. The index data switch 210 is normally provided on one of the control panels 146, 147 of the machine, see Fig. 11, and, when operated, the movable contact arm 210' completes a circuit through the line 211 including the relay coil of the index data relay and the movable contact arm 212a of the time delay device 212, resulting in energization of the relay and consequent attraction of the contact arms 201a, 201b and 201c of the index data relay. With swinging of the contact arm 201a away from the position in which it is seen in Fig. 12 completing the high voltage circuit to the filaments of the lamps 22 and 22', the illuminating circuit to the lamps is broken, but instead a circuit is completed through the line 213 including the filaments of the index data lamp 209 returning to the high voltage circuit at the adjustable resistance 204. The contact arm 201b is necessary to complete the circuit from the line 154 to the primary of the high voltage transformer through the line 214 including the contact arm 201b, because the index data switch is intended to be actuated only when no documents are being fed, under which condition the circuit through the document relay to the primary of the high voltage transformer 199 will be open at the contact arm 196b of the document relay. 212b represents a rectifier which provides a time lag in energization of the relay coil 212c. The time lag provided ensures that after the predetermined lapse of time the relay coil 212c will become energized and then will open the normally closed contact arm 212a to restore the circuit for normal operation by the document switch 136 when further documents are fed into the machine. Since it is necessary for proper recording of the projected image data on the film to provide the full degree of exposure provided for by the time lag, a circuit is completed through the contact arm 201c to hold the index data relay for the predetermined exposure time despite the fact that the press button controlling the index data switch may be held on too long or prematurely released.

For sub-division of groups of items it is often desirable to provide for manually controlled spacing consisting of, for example, three inches of unexposed film at the termination of one group before starting the next. For that purpose, a manual space control switch is provided on one of the panels 146 or 147 of Fig. 11, such switch being here indicated in Fig. 12 by the reference numeral 215. On actuation of the manual space switch 215, the contact arm thereof is swung from the normally open switch position in which it is here shown to the closed position in which it closes a circuit from the line 216 branched off the line 192 and including the relay coil of the manual space relay, the movable contact arm of the three inch timer switch 217, and the camera actuated plunger switch 194A to the line 155 constituting the other side of the circuit.

The three inch timer includes a clutch element 218, which is power actuated on an energization of the coil 219 by closure of the manual space relay contact arm 166b in the line 221 with energization of the relay, to drive the cam 220 from the jack shaft. The switch contact arm 166A of the manual space relay on the end of the line 154 connects, with energization of the relay, through the line 222 with the line 194 for energization of the camera clutch solenoid 195. The cam 220 normally resets itself to a starting position from which, with a predetermined rotation, its projection 220' engages the contact arm 217 to break the timer circuit, during which time however, with operation of the camera clutch, about three inches of film will feed through the camera. Since with closure of the circuit through the manual space relay contact arm 166A across the lines 154, 222, the circuit is broken to the line 167, the primary of the low voltage transformer 168 is cut out of the circuit and the lamps are rendered ineffective, and the traversed three inches of film are left unexposed. The contact arm 166c of the manual space relay serves to hold the relay in pending the time cycle, and dictates the positive spacing despite momentary action of the manual space switch 215.

In the copending application of Harold T. Olson, Serial No. 71,942, filed January 21, 1949, there is described a system of indexing by means of which the image of a signal light may be projected onto a marginal portion of the traveling film to produce a signal strip alongside document images in the finally processed film. Means may be optionally embodied in the apparatus according to the present invention to achieve such indexing by operation of a conveniently spaced manually controlled signal strip switch 223 for energization of the signal strip relay 224 and the signal strip solenoid 225 connected in circuit with the timer and camera clutch solenoid for operation in the same manner as the manual space switch 215. Thus with operation of the signal strip switch 223, the signal strip can be repeated alongside the documents photographed on about the next three inches of film.

If the camera actuated plunger switch 194A is set for 19:1 ratio drive reduction used for single sided photography, the timer cycle will be made through the contact arm 217A but since the magnification and rate of film feed is nearly double, about three inches of film will still be fed for each operation of the timing cycle whether it is initiated by the manual space switch 215 or the signal strip switch 223.

Somewhat similar in nature and operation to that of the three inch timer cycle is the three foot timer cycle actuated by the cam 226, the function of which cycle is to wind about three feet at each end of the film as leader and trailer strip in accordance with the normal procedure in microfilm document photography. Thus, when nearly all available film supply on the film supply spool has been used up, the contact arm 177, which is embodied in the camera in association with the takeup spool, opens the control circuit and the "camera full" pilot lamp 177' lights up and the camera should then be removed from the machine. Operation of the camera access door 149, see Fig. 11, effects momentary actuation of the camera access door switches 160 and 161 for energization of the leader trailer relay 227 as the contact arm 161' is swung over momentarily to connect the line 228 through 229 and contact arm 196a of the document relay 196 which latter is in the position in which it is shown in Fig. 12 with energization of the document relay coil since no documents are now being fed to the machine for operation of the document relay switch. With energization of the leader trailer relay, the contact arm 227a connects the lines 192 and 216 for energization of the entrance roller declutch solenoid 55 to stop entrance roller drive, the contact arm 227b similarly completing the circuit to the camera clutch solenoid for camera drive while at the same time the contact arm 227c serves to hold the relay in circuit despite momentary actuation of the camera door switch 161. Simultaneously, with energization of the timer clutch coil 230 in the line 231, the camera door switch contact arm having now returned to the position in which it is shown after its momentary actuation, the three foot timer cycle is started and continued in a manner the same as that described with reference to the operation of the three inch timer cycle. The three foot timer cycle continues with film feed drive and interruption of the entrance roller drive until its cycle is completed with opening of the circuit either at the contact arm 163 or the contact arm 163a, according to the setting of the camera actuated plunger switch 164, whereafter the main power relay drops out to stop the machine.

A similar three foot timer cycle occurs with closure of the access door switch 160 when the newly loaded camera is inserted in order to wind approximately three feet of film as leader strip which may have been fogged in the loading procedure. It is to be noted that providing the access door safety switches and the main on and off switch 158 are closed, the leader trailer cycle will always be initiated regardless of whether the motor is running or not.

The circuit provides for entirely automatic operation of the apparatus. Thus, with the access door switch 157 and the main on and off switch 158 closed, closure of the camera access door after reloading the camera with new film actuates the camera door switches 160 and 161, bringing in the power relay to run the motor. At the same time, the solenoid of the document relay 196 is energized with the result that the circuit is completed through the contact arm 166a, line 229, camera door switch 161 and line 231 including the coil 230 which is thus energized to start the three foot timer cycle, and the motor continues to operate until the power relay 159 drops out with breaking of the circuit at the arm 163 or 163a as the case may be, whereupon the motor will stop. It should be noted that with actuation of the camera access door switch 161 the camera clutch solenoid 195 is energized through the relay 227 and the camera is thus driven for film feed during any three foot timer cycle initiated by actuating the camera access door switches. To set up the machine for photographing, the start reset switch 232 is actuated momentarily which energizes the coil 159a causing the contacts 159b and 159c to close to start the motor and maintain the current through the coil 159a. Return of the switch 232 to the position in which it is seen in Fig. 12 subsequent to its momentary actuation, reenergizes the document relay 196 again to set up the circuit for energization of the coil 230 and the result of that is that, if no documents are fed to the machine before the three foot timer cam 226 completes its cycle, the relay coil 159a will be deenergized, and the power supply to the machine will be broken by the opening of the contacts 159b and 159c. Normal feeding of documents, of course, overrides the three foot timer but its cycle starts as soon as there is any cessation of document feed. It is also important that the leader trailer relay when set up operates automatically to wind approximately three feet of film whichever of the alternative cameras are used, because installation of the appropriate camera sets up the switch 164 accordingly, as is also the case with the switch 164a associated with the three inch timer.

It is also of considerable operational advantage that in addition to the signalling of defects in the operation of the apparatus, the drive to the entrance rollers is interrupted and no further documents can then be fed to the machine; since, however, it is only the drive to the entrance rollers which is interrupted any documents already in the machine will be processed without interruption.

The start reset switch 232 can be actuated if at any time it is desired to interrupt the operation of either the three inch or the three foot timer cycles. Similarly if it is desired to nullify operation of the thickness control switch 123, the by-pass switch 233 can be actuated to deenergize the entrance roller declutch solenoid 55 for continuing document feed. That is especially convenient where, for example, a few checks remain to be copied when the "camera full" signal is given. The operator can then, by holding down the by-pass switch 233, nullify operation of the control circuit causing the entrance rollers to turn to accommodate a few more records on the preliminary part of the trailer strip.

The nature of the camera switches 176 and 177 will be fully understood with reference to the aforesaid application of Harold T. Olson, Serial No. 119,529 filed concurrently herewith. In addition to the "camera full" and "camera empty" switches, the camera may embody another switch actuated by film breakage or by a defect in film feed as described in that application. A separate pilot light may be associated with that switch circuit as part of the control circuit but in general it suffices to utilize the "camera empty" pilot light also as an indication of any defect developed in film feed. In that respect it will be appreciated that, for all practical operating purposes, film feed defect and "camera empty" signals are virtually synonymous, at least insofar as they call for immediate attention to the camera. Since the camera embodies a film footage indicator at the top which is immediately apparent on opening of the camera access door, the operator can tell at once whether the camera is really empty, or whether the film feed has developed a defect, and can attend to the matter accordingly.

Since, in general, it will be desirable to record the number of copies taken by the machine, the solenoid 234 can be included in the document relay circuit for actuation of a counter at each operation of the document actuated switch 136.

The combined choke and variable resistance 202 is operable for varying the high voltage current flowing to the lamps 22, 22' and thereby to control the illumination intensity, which is desirable not only to compensate for different document contrasts, but also to facilitate obtaining the proper relation between exposure, rate of document feed and the required aperture width.

It is to be understood that the foregoing description deals with the fullest embodiment of the invention providing a machine which is automatic and practically fool proof in operation. Many of the refinements referrerd to are not fundamentally necessary. Thus, provided the aperture is correctly proportioned, the lamps for document illumination in the aperture could be kept alight permanently during operation of the machine, and the document feed relay 196 along with the document actuated switch 136 could then be eliminated. The thickness control, though desirable, could also be omitted, as well as the automatic timer cycle controls for winding trailer and lead strips and for manual spacing, both of which could in a simpler form of the machine be done by a manual winding operation. The indexing circuits could also be eliminated entirely. The pilot lamps for indicating the condition of the circuit are desirable in some form or other, but they need not be so connected in the circuit as to achieve automatic stoppage of the machine through the control circuit as hereinbefore described for it would be a simple matter for the operator to stop the machine by operation of the main switch 158 on any circuit defect being signalled.

In a simpler form of the machine the optical system could no doubt also be simplified by the omission at least of some of the reflector stages. Also, where only single sided copying is required, as may well be the case for some purposes the rear lamp 22′ could be omitted with corresponding simplification of the reflector system.

The arrangement and disposition of the lamps 22, 22′ is an important feature of the invention as applied to double sided document copying, for not only is it necessary to preserve symmetry of the average intensity at the leading and trailing edges of the aperture as hereinbefore described, but also the projection of light obliquely onto a document into the aperture is found to minimize the production of so called ghost images, which have hitherto introduced difficulties in flow film double sided document photography. The ghost images result from the matter on the front of the document being visible through the back and vice versa when the document is illuminated in the photographic field, and they are especially apparent in the final image when the documents being copied are thin and fairly transparent. It is believed that fluorescent lighting seems less liable to penetrate the paper than ordinary incandescent lighting and, moreover, that the oblique projection of light onto the document virtually lengthens the light path through the document.

It is also to be understood that though in the foregoing description the lamps 22, 22′ and the index data lamp 209 have been described as fluorescent lamps, they may be gaseous discharge lamps of any convenient type irrespective of whether they have a fluorescent coating and where the term "fluorescent lamp" is employed in the ensuing claims it is intended to be interpreted widely enough to include gaseous discharge lamps generally.

The invention claimed is:

1. In flow film photographic apparatus including means for feeding documents at a predetermined speed past an elongated aperture disposed adjacent to and extending transversely across the path of document travel and means for driving film exposed to said aperture at a related rate of film feed for photographically copying said documents illuminated in their passage past said aperture; the provision of leader and trailer strip winding means for winding a predetermined length of leader strip off the supply spool onto the take-up spool on starting the camera after reloading film and for winding a predetermined length of trailer strip from said supply spool over the exposed film on said take-up spool when the latter has been filled to a predetermined extent; said leader and trailer strip winding means being operatively associated with means normally controlling the document feed means for preventing feeding of documents into the machine during operation of the leader and trailer strip winding means.

2. Flow film photographic apparatus as set forth in claim 1 having said leader and trailer strip winding means operatively associated with means for controlling the document illuminating means to extinguish said document illuminating means during operation of said leader and trailer strip winding means whereby said leader and trailer strips are unexposed.

3. Flow film photographic apparatus as set forth in claim 1 including manually operable switch means for deactuating the means for preventing feeding of documents during operation of said leader and trailer strip winding means and at least during a trailer strip winding operation; said manually operable switch means being operable to actuate the document feed means for normal flow film photographing operations.

4. In flow film photographic apparatus including document feed means adapted to feed documents at a predetermined speed past an elongated aperture disposed adjacent to and extending transversely across the path of document travel, said feed means incorporating a cooperating set of entrance rollers capable of being stopped independently of the rest of said document feed means to halt the entry of documents into the document feed mechanism, and control means operative to stop said entrance rollers either because of a failure of a normal operating function of said apparatus or for winding trailer strip at the end of a roll of film, and signal means operative to provide a warning signal upon interruption of the driving of said entrance rollers by said control circuit.

5. Flow film photographic apparatus as set forth in claim 4 in which the entrance rollers are driven separately from the remainder of the document feed mechanism, whereby, operation of said control circuit results merely in interruption of document feed by stopping said entrance rollers, thereby stopping the feeding of further documents while enabling feed of documents already in the apparatus to continue normally.

6. In combination in flow film photographic apparatus, means defining a flow film photographic aperture, document feed means for feeding documents past said aperture, means for illuminating said aperture, means for feeding film at a predetermined rate of feed relative to the rate of document feed, means for focussing the image of a document illuminated in its passage past said aperture onto said film for flow film photographic recording of said image, means for winding film independently of said document feed, electrically actuated motor means drivingly connected with said document feed means and said film feed means, a control circuit operatively associated with a signal circuit for controlling the entry end of said document feed mechanism to render said entry end of said document feed mechanism inoperative on operation of said control circuit, means associated with said film feed means for operating said winding means automatically for winding leader and trailer strip on the film take-up means, and manually operable switch means operable to render said control circuit ineffective whereby said document feed means continues to feed documents during said film strip winding.

7. The combination as set forth in claim 6 characterized by the inclusion of timer means determining the duration of time of ineffectiveness of said control circuit; said timer means being connected in circuit with said manually operable switch means, said motor and said document feed means to stop the entrance rollers if no documents are fed to the machine during the normal operating cycle of the timer.

8. In flow film photographic apparatus, the combination of means for feeding documents past an elongated aperture disposed adjacent to and extending transversely across the path of document travel, said document feeding means including entrance rollers independently operable from the remainder of the document feed means; alternative cameras for recording either one or both sides of documents for selective installation in said apparatus, said cameras having different document size reproduction ratios and different internal reduction gearing to provide different rates of film feed; constant speed driving means in said apparatus for driving film feed means in said cameras at an internally adjusted rate of film feed related to the speed of document feed for exposing film to said aperture for photographically copying said documents, means for illuminating said documents; switch means automatically operable to effect operation of said camera film feed for winding leader and trailer strips independently of document feed, timer means controlling said film winding, said timer means selectively operable by said alternative cameras on installation in said apparatus to interrupt said film winding upon completion of winding predetermined lengths of leader or trailer strips whichever camera is installed, and means for stopping said entrance rollers to prevent feed of documents into said apparatus during operation of said switch means and film winding thereby while operation of the remainder of said document feed means continues.

References Cited in the file of this patent

UNITED STATES PATENTS

| Number | Name | Date |
|---|---|---|
| 2,251,570 | Hessert | Aug. 5, 1941 |
| 2,353,512 | Simmon | July 11, 1944 |
| 2,358,649 | Landrock | Sept. 19, 1944 |
| 2,458,769 | Debrie | Jan. 11, 1949 |
| 2,461,185 | Schubert | Feb. 8, 1949 |
| 2,481,694 | Schubert | Sept. 13, 1949 |
| 2,552,266 | Eagen | May 8, 1951 |